June 27, 1933.

J. B. O'CONNOR

FOLDING TABLE

Filed Jan. 30, 1928

Re. 18,883

2 Sheets-Sheet 1

Inventor:
John B. O'Connor
By Cheever & Cox Attys.

June 27, 1933.
J. B. O'CONNOR
FOLDING TABLE
Re. 18,883
Filed Jan. 30, 1928
2 Sheets-Sheet 2
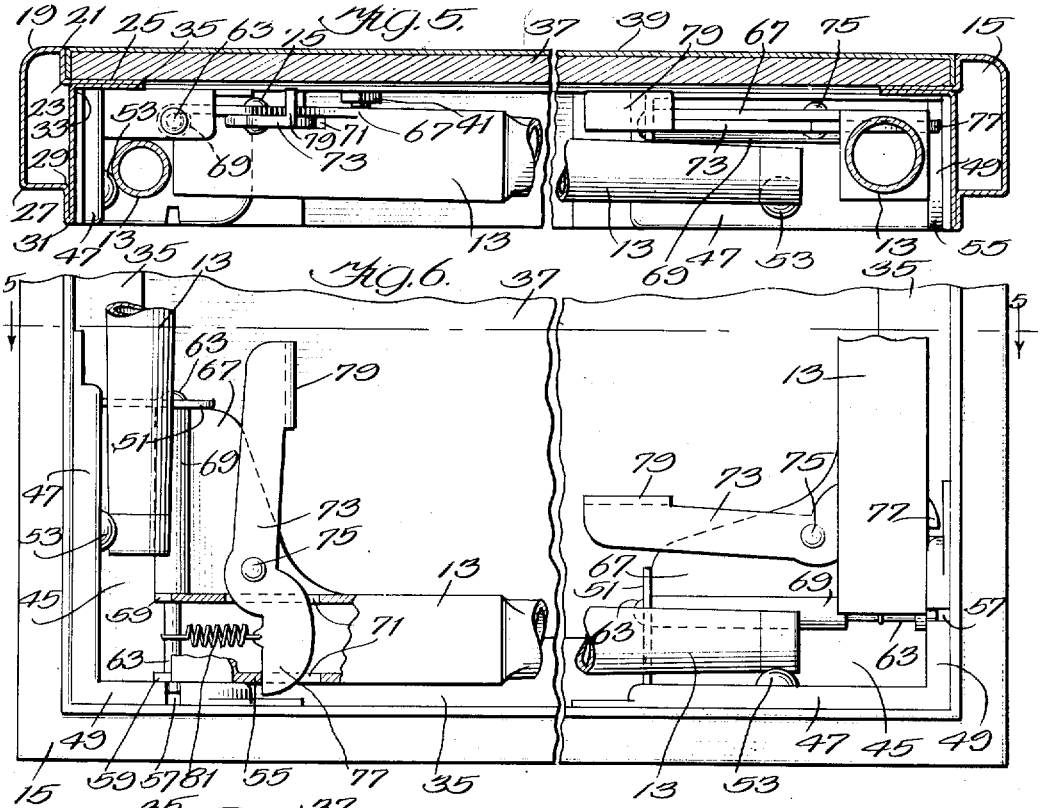
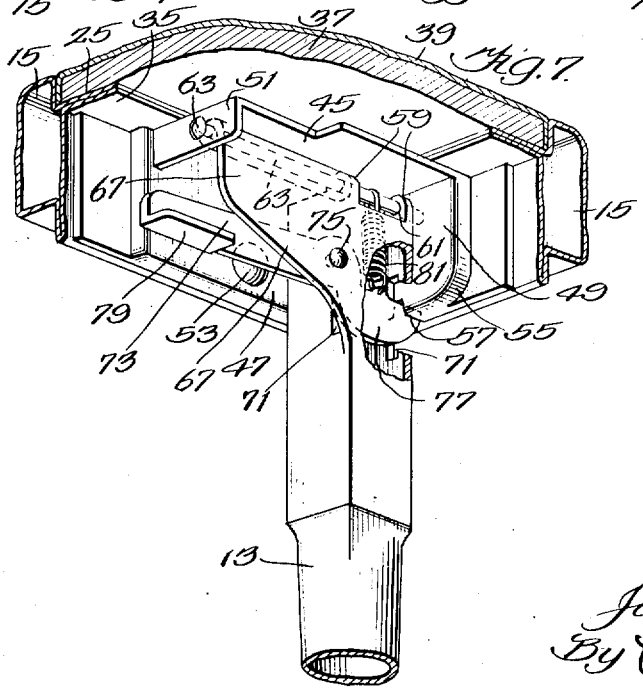
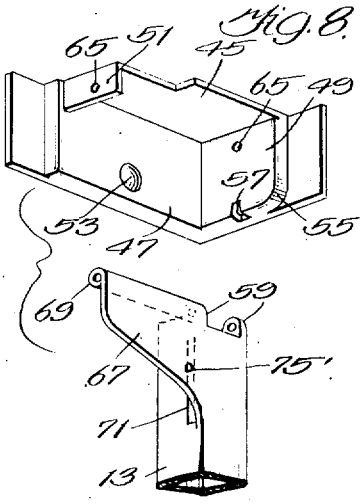
Inventor:
John B. O'Connor
By Cheever & Cox Attys.

Reissued June 27, 1933

Re. 18,883

UNITED STATES PATENT OFFICE

JOHN B. O'CONNOR, OF AURORA, ILLINOIS, ASSIGNOR, BY MESNE ASSIGNMENTS, TO LYON METAL PRODUCTS, INCORPORATED, OF AURORA, ILLINOIS, A CORPORATION OF ILLINOIS

FOLDING TABLE

Original No. 1,879,945, dated September 27, 1932, Serial No. 250,462, filed January 30, 1928. Application for reissue filed May 10, 1933. Serial No. 670,331.

This invention relates in general to tables and has more particular reference to a table having pivoted legs adapted to fold up within the zone of the table top whereby the table may be collapsed into small compass for storage purposes and to be extended at open position substantially normal to the plane of the table. More specifically, this invention relates to the provision, in a folding table, of means for securely hinging the legs to the table and of simple means for locking the legs firmly in open position and yieldingly in folded position.

The primary object of the present invention is to provide a new and improved table having a novel leg construction and latching means.

Another important object of the invention is the provision of a hinge construction comprising a bracket secured to the table and a pintle carried in a flange formed in the leg and pivoted in the bracket, the pintle, flange and bracket being of substantial length in the direction of the axis of the hinge whereby wabbling of the leg is prevented.

Another object of the invention is the provision of a latch of simple construction, positive action and rugged construction adapted to secure the leg of a folding leg table firmly in open position.

A further object of the invention is the provision of a leg hinge bracket adapted for arrangement in the corner of a table of the folding leg type to pivotally support the upper end of a leg, and having a formation therein adapted to engage the lower end of another leg when in folded position whereby to support it in closed position.

A still further object of the invention is the combination of hinged legs and latches for a folding leg table of simplified construction whereby a sturdy and easily operated folding table may be made economically, and at the same time having a pleasing appearance and giving satisfactory and efficient operation over a long period of service.

Numerous other objects and advantages will be apparent throughout the progress of the following specification.

The accompanying drawings illustrate a selected embodiment of the invention and the views therein are as follows:

Figure 5 is a view similar to Figure 3 with the table legs in relatively folded position;

Figure 6 is a view similar to Figure 4 with the table legs in relatively folded position;

Figure 7 is a perspective view of the hinge construction as it appears in place in the table; and Figure 8 is a perspective view of the individual parts comprising the improved hinge construction of the present invention.

The folding table herein shown for the purposes of illustration has a top 11, and separating legs 13 which are pivotally mounted to the table top. The legs are adapted to be arranged in substantially normal open position, or to be folded within the zone of the table top to form a compact folded table when not in use.

Figure 3:
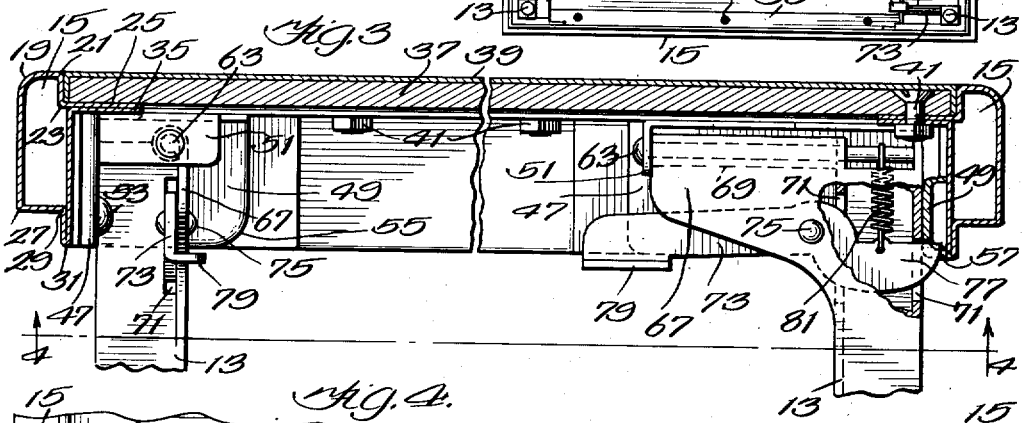
Figure 3 is an enlarged vertical cross section taken substantially along line 3—3 in Figure 2.
Figure 4:
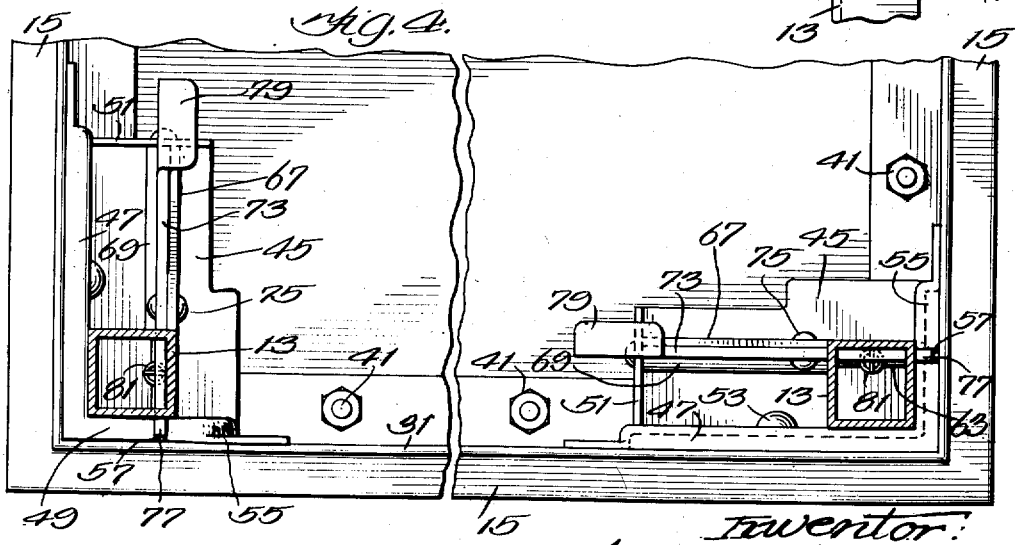
Figure 4 is a horizontal cross section taken substantially along the line 4—4 in Figure 3.

The table top comprises the peripheral rim 15 which is formed from a single strip of material suitably cut and configurated to form the periphery of the table top, being in the illustrated embodiment, bent to form a square table rim. The body of the rim lies in a substantially vertical plane, and the upper edges of the rim strip are bent inwardly as at 19 to form a rounded corner. The upper edge is thence bent vertically downwards along a line of bend 21, Figures 3 and 5, thence normally inwards along a line of bend 23 to provide a ledge 25. The lower edges of the strip are bent inwardly at right angles to the main body of the strip along a line of bend 27, thence downwardly parallel with the plane of the main body along a line of bend 29, thence backwardly along a line of bend 31 and extend upwardly to the ledge 25. The extreme lower edge portions are finally bent inwardly along a line of bend 33 to provide a ledge 35 parallel and adjacent to the ledge 25. The ledges may be secured together as by welding or any other convenient means, to provide an annular table top supporting flange. In order to strengthen this flange, it may be desirable to extend this ledge 35 inwardly beyond the inner edge of the ledge 25 and fold the extended ledge portion over to enclose the outer edges of the ledge 25, said folded portion being secured to the ledge 25 by spot welding or any convenient manner.

Figure 1:
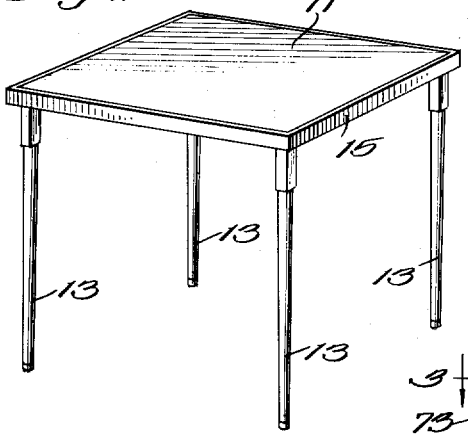
Figure 1 is a perspective view of a folding leg table embodying the present invention showing the legs in open position.
Figure 2:
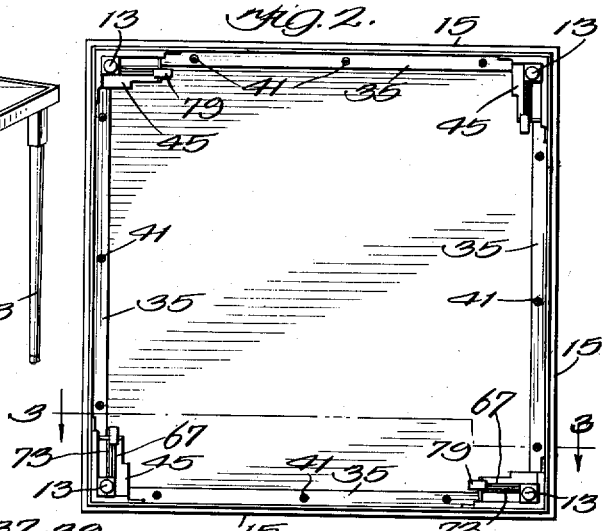
Figure 2 is a bottom plan view of the table shown in Figure 1.

The table top consists, in the illustrated embodiment, of a square board which may be formed of any convenient material and a suitable cover 39 which is wrapped about the board. The table top is then arranged in the seat formed by the ledges 25 and 35 and is secured in position therein by convenient fastening means such as the nuts and bolts 41 illustrated, Figures 2 and 3.

The particular top construction is shown in applicant's divisional application, Serial No. 483,400, filed September 22, 1930, for Folding table top.

The folding legs are pivoted to the rim 15 at each of the four corners of the table, and are arranged to fold into the zone of the peripheral rim beneath the top supporting ledge thereof. The legs are supported in brackets which in turn are secured to the inner surface of the rim immediately beneath the top supporting ledge. Each bracket is formed from a single strip of metal suitably cut and bent to provide a hinge portion having a top 45 from which an end 49 and a side 47 are bent at right angles. The edge of the top 45 opposite the bent end 49 is also bent downwardly to provide an end 51. The side 47 of the bracket is provided with an offset protuberance 53 formed at the lower edge of the portion and the end 49 is offset to provide a cam surface 55 therein. The lower edge of the end 49 is provided with a notch 57 adjacent the cam surface 55. The bracket is arranged in the table with its upper surface 45 engaging the exposed lower surface of the edge 35, its side 47 engaging the single surface of the rim 15 and the end 49 engaging the single surface of the adjacent side of the rim. The bracket portions 45, 47 and 49 may be secured to the rim 15 by any convenient means, although I prefer to use spot welding or the like.

The legs 13 comprise tubular members having a substantially square cross section at their upper ends. Each leg is provided at its upper end with ears 59 having apertures 61 formed in opposite sides of the leg adjacent one side thereof. The leg is constructed to provide a lateral flange 67 which lies in a plane of a side of the leg. This flange has an upper edge 69 which is curled over to form a journal, the axis of which is in alignment with the apertures 61. The journal and the ears are adapted to support a rod 63 which extends outwardly thereof at each end and is pivoted in holes 65 formed in the spaced end portions 49 and 51 of the bracket. This rod extends through these apertures and is riveted for the purpose of securing it in place. This arrangement insures a substantially long hinge for the leg, which prevents the leg from wabbling in the plane of the axis of the hinge. The parts are so arranged that when the leg is in open position, it is arranged at the corner of the table and when in folded position extends parallel with the side of the rim to which the end 49 of the bracket is attached. A similar bracket is attached at the adjacent corner of the rim with its side 47 secured opposite the lower end of the leg when it is in folded position and the protuberance 53 therein is arranged in position to cooperate with the lower end of the folded leg in order to secure it in folded position, the resilience of the leg allowing it to be sprung over the protuberance which thereupon engages beneath the leg and maintains the same in folded position within the zone of the rim.

In order to secure the leg of the table in open position, there is provided an improved latch construction which comprises a detent arranged in the upper portions of the leg and a cooperating keeper formed in the bracket. The keeper comprises the cam surface 55 and the notch 57 heretofore described. The detent comprises an arm formed from a metal strip and having a detent portion 73, a body 77 and a handle 79. The detent and the blade are arranged through slots 71 formed in the side walls of the leg, and the body 77 is pivoted by means of a pin 75 engaging through an aperture 75′ formed in the flange 67, the handle 79 extending beyond the lower edge of the lateral flange. The detent is normally urged in an upward direction, that is to say, toward the axis of the hinge, by means of a spring 81 secured as at 83 to the detent body portion 77 within the leg and to the hinge pin 63. The outer end of the detent 73 extends outwardly of the leg and engages the cam surface 55. When the leg is arranged in fully opened position, the detent registers with the notch 57 and engages therein under the influence of the spring 81. When it is desired to fold the legs into the zone of the rims, the detent may be released from engagement with the notch by pressing upwardly on the handle 79. This operation releases the detent from the notch whereupon the leg may be swung to folded position, the detent sliding along the cam surface 55, the end of the leg being sprung behind the protuberance 53 of the adjacent bracket. When it is desired to open the leg, the lower end is sprung from behind the protuberance 53 and the leg is then swung or moved to open position, the detent 73 riding upon the cam surface 55 and being guided thereby into registration with the notch 57.

The invention provides a simple, efficient, easily operated folding table composed of relatively few and simple parts, and can be readily and economically manufactured.

Changes may be made in the form, construction, and arrangement of the parts without departing from the spirit of the invention or sacrificing any of its advantages, and the right is hereby reserved to make all such changes as fairly fall within the scope of the following claims.

Having thus described the invention what I claim as new and desire to secure by Letters Patent is:

1. In a table having folding legs, a hinge connection between the table and a leg, a latch member pivoted in the leg and having an extending detent and a latch keeper comprising a cam surface and a notch formed in the table in position such that the detent registers with the notch when the leg is in open position.

2. In a table having folding legs, a hinge connection between the table and a leg, a latch member pivoted in the leg and having an extending detent, a latch keeper comprising a cam surface and a notch formed in the table in position such that the detent registers with the notch when the leg is in open position and means resiliently urging the detent into the notch whereby the leg may be locked in open position.

3. In a table having folding legs, a hinge connection between the table and leg, a latch member pivoted in the leg and having an extending detent, and a latch keeper comprising a cam surface and a notch formed in the table in position such that the detent registers with the notch when the leg is in open position, said cam surface being arranged to engage the detent during the leg opening operation whereby to guide the detent into the notch.

4. In a table having folding legs, a pivoted detent carried by each leg and resiliently urged to engage a keeper formed in the table, said keeper comprising a notch and a cam surface formed to cooperate with the detent to guide said detent to said notch while the legs are being opened, and said notch being arranged to register with and receive the detent when the legs are in open position.

5. In a table having folding legs, a hinged construction for said legs comprising a bracket member carried by the table and providing two substantially parallel spaced-apart flanges, each table leg comprising a hollow sheet metal member the upper portion of which is provided with an integral sheet metal flange extending laterally of the leg and curled at its uppermost portion to provide a keeper for a pivotal pin, said keeper portion being co-extensive with the distance between the flange portions of said bracket, a pivotal pin passing through said keeper portion and through the flange portion of said bracket, the upper portion of said leg being provided with a longitudinal slot passing through opposite portions of the leg, and a locking latch mounted within the upper portion of said leg and passing through said slots and adapted to engage a cooperative portion of the bracket to lock the leg in open position, and a spring mounted within the hollow upper portion of the leg and connected with the latch for normally urging the latch to locking position.

6. A table construction comprising in combination a square sheet metal frame provided with a table top, a rigid sheet metal bracket adapted to fit in each corner of the frame and to be rigidly secured to the inner corners of the walls thereof, comprising an angular bracket having side walls disposed at right angles to one another and having an integral top portion adapted to underlie the top of the table, said top portion having a depending flange disposed parallel to one of said side walls, and said flange and said parallel side wall having opposed openings for the reception of a pivotal pin, said parallel side wall having a vertical wall, the lower portion of which is provided with a rounded cam surface and with an adjacent locking notch, and a leg having an upper hinge portion adapted to receive the pivotal pin for pivotally mounting the leg to the bracket, said leg carrying a pivoted latch having a locking portion adapted to enter the locking notch of said parallel wall and adapted, when moved out of said notch, to slide along the rounded cam portion and up the vertical wall thereof.

7. A table construction comprising in combination a square sheet metal frame provided with a table top, a rigid sheet metal bracket adapted to fit in each corner of the frame and to be rigidly secured to the inner corners of the walls thereof, comprising an angular bracket having side walls disposed at right angles to one another and having an integral top portion adapted to underlie the top of the table, said top portion having a depending flange disposed parallel to one of said side walls, and said flange and said parallel side wall having opposed openings for the reception of a pivotal pin, said parallel side wall having a vertical wall, the lower portion of which is provided with a rounded cam surface and with an adjacent locking notch, and a leg having an upper hinge portion adapted to receive the pivotal pin for pivotally mounting the leg to the bracket, said leg carrying a pivoted latch having a locking portion adapted to enter the locking notch of said parallel wall and adapted.

when moved out of said notch, to slide along the rounded cam portion and up the vertical wall thereof, the wall of the bracket which lies at right angles to the wall having the locking notch therein carrying an outstanding projection adapted to provide a friction catch for the bottom portion of an adjacent leg of the table to hold such leg in closed position.

8. In a table, the combination of a bracket adapted to be attached thereto, said bracket having spaced-apart members forming walls having apertures for the reception of a pivotal pin, a leg adapted to be pivoted to said pin, said leg being formed of sheet metal and having its upper end formed with a relatively broad flange curled at its top to provide a keeper to receive said pivotal pin, said curled portion of said leg adjacent the hollow upper portion of said leg being cut away, the upper portion of said hollow leg adjacent said integral broad flange thereof being provided with longitudinal slots passing through opposite portions of said leg, and a locking latch passing through said slots and pivotally mounted on said relatively broad flange, and a spring mounted within the hollow portion of said leg and connected to said latch, said spring having a portion passing over the pivotal pin for said leg and means on said bracket for lockingly cooperating with said latch.

9. In a folding table of the class described, the combination of a table top, a bracket connected to said top and having a pair of substantially parallel spaced arms, a hollow leg member having two upper portions disposed between said arms, a pivot pin extending through said arms and through the leg portions disposed therebetween, said leg being thereby pivotally mounted in said bracket member, a locking member extending through said leg and having a portion adapted to interlock with a portion of the bracket arm so as to maintain the leg in extended position, and a spring for yieldingly urging said locking member into said interlocking engagement, and means for mounting said spring within said leg.

10. A folding table of the class described, the combination of a table top, a bracket connected to said top and having a pair of substantially parallel spaced arms, a hollow leg member for supporting said top, said leg member having its upper end portion disposed between said bracket arms and having a slot extending therethrough and elongated lengthwise of the leg, a pivot pin extending through said arms and leg for pivotally mounting the leg in said bracket, a locking bar disposed in said elongated slot so as to be movable lengthwise of the leg and having a portion projecting from the leg so as to be capable of engaging a portion of the bracket arm, a spring disposed within the leg for yieldingly urging said locking bar to move lengthwise of the leg and to engage it with said bracket arm having a notch for receiving the projecting portion of the locking bar so as to interlock the bar and bracket arm, thereby to maintain the leg in fixed position relative to the bracket table top.

11. In a sheet metal folding table, the combination of a top member provided with a bracket having spaced-apart pivotal bearings, and a sheet metal leg having integrally formed square shaped upper portions, one of the side walls of said square upper portion being provided with an integrally laterally extending sheet metal flange of relatively much greater width than the width of the leg, said flange being curled at its upper end to provide a keeper for a pivotal pin passing through said keeper and through the said metal pivotal portions of said bracket to support said leg in position.

12. In combination with a sheet metal folding table, a table top having a bracket provided with spaced-apart pivotal bearings, a sheet metal leg of tubular formation, the lower portion of said leg being substantially round and the upper integral portion of said leg being of square formation, one side of the square formation having an integral laterally extending sheet metal flange of considerably greater width than the width of the square portion, said flange being curled at its upper end to provide a keeper for a pivotal pin passing through said keeper and through the flanges of said bracket.

13. In a table having legs, means swingingly connecting said legs to said table whereby the legs may be selectively moved to extended or folded position, cams fastened to said table and having a notch therein, locking members carried by said legs and engaging the notch when the legs are in extended position, and spring means arranged inside of said legs and operatively connected to the locking members for urging the locking members against the cams.

14. In a table having legs, means swingingly connecting the legs to the table, a cam for each leg and carried by a part of said table, said cam having a notch therein, a locking member carried by each leg and engaging the notch when the said leg is in extended position, and spring means arranged inside of each leg for urging the locking member against the cam to hold the locking member into the notch.

15. In a table having legs, means for swingingly mounting the legs to the table whereby the legs may be moved to either folded or extended position, a cam for each leg and carried by a part of said table, each cam having a notch therein, a locking member carried by each leg and engaging the notch in the cam when the leg is in extended position, spring means arranged inside of each leg for urging the locking member against the cam to hold the locking member into the notch, and means operatively associated with the locking member for releasing the locking member from the notch to permit folding or extending movement of the leg.

16. In a table having folding legs, a cam carried by a part of said table and having a notch therein, a locking member carried by a leg and engaging the notch when the leg is in extended position, spring means arranged inside of said leg for urging the locking member in a predetermined position, and a handle integral with said locking means and extending through said leg to release the locking member to permit folding movement of said leg.

17. In a table having folding legs, a lever pivoted to a leg, a latching end on said lever and extending through the leg, a keeper for said latching end, spring means inside of said leg and connected to said lever for urging the latching end in a predetermined direction, and an arm on said lever and extending through the leg for retracting the latching end from the keeper against the tension of said spring.

18. A table having folding legs, an extension rigid with a leg, a relatively long pivot pin for pivoting the leg and extension to a part of the table, a lever pivoted to said extension and having a latching end extending through the leg, a spring inside of the leg and connected to the lever for urging the latching end toward the top of the leg, a handle integral with said lever and extending beyond the projection for moving the latching end against the tension of the spring, and a keeper for said latching end.

19. A table having folding legs, an extension rigid with a leg, a relatively long pivot pin for pivoting the leg and extension to a part of the table, a lever pivoted to said extension and having a latching end extending through the leg, a spring inside of the leg and connected to the lever for urging the latching end toward the top of the leg, a handle integral with said lever and extending beyond the projection for moving the latching end against the tension of the spring, a keeper for said latching end, a cam member adjacent the leg and engageable with the latching end, and a slot in said cam member for receiving said latching end, said latching end riding on a cam during folding movement of the leg and being pulled into the slot by the spring at the end of the folding movement of the leg.

20. A table comprising a top, a cam member supported by said top, a leg pivotally connected to the top, said cam having a notch therein, a locking member carried by the leg riding over said cam and engageable with the notch, and pivoted means for disengaging said locking member from said notch.

21. A folding table comprising a top, legs pivotally connected to said top, a latch member for each leg and extending through said leg, means for pivoting the latch member to the leg, said latch member engaging a part of the table for locking the leg in a predetermined position.

22. A folding table comprising a leg having a slot formed therethrough, a latch member pivoted to the leg and extending through the slot on opposite sides of the leg, one side of said latch member providing a latching end and the other side an operating end, and a keeper for the latching end.

23. A folding table comprising a leg, means pivotally connecting the leg to the table, a latch member extending through the leg, means for pivoting the latch to the leg, and keeper means engageable with the latch for locking the leg in a predetermined position.

24. A folding table comprising a leg pivotally connected to a part of the table, said leg having a slot therethrough, a latch member arranged in the slot, means for pivoting the latch to the leg, and keeper means for the latch to lock the leg in a predetermined position.

25. A folding table comprising a leg having a hollow part, means for pivotally connecting the leg to the table, a latch arranged inside of the hollow part of the leg and arranged at an angle to the longitudinal axis of the leg, pivot means fastened to the hollow part of the leg for pivoting the latch to the leg, and means cooperating with the latch for locking the leg in a predetermined position.

JOHN B. O'CONNOR.